Nov. 12, 1935.  E. H. PETZOLD, JR  2,020,373
BAKING PAN
Filed Feb. 5, 1934
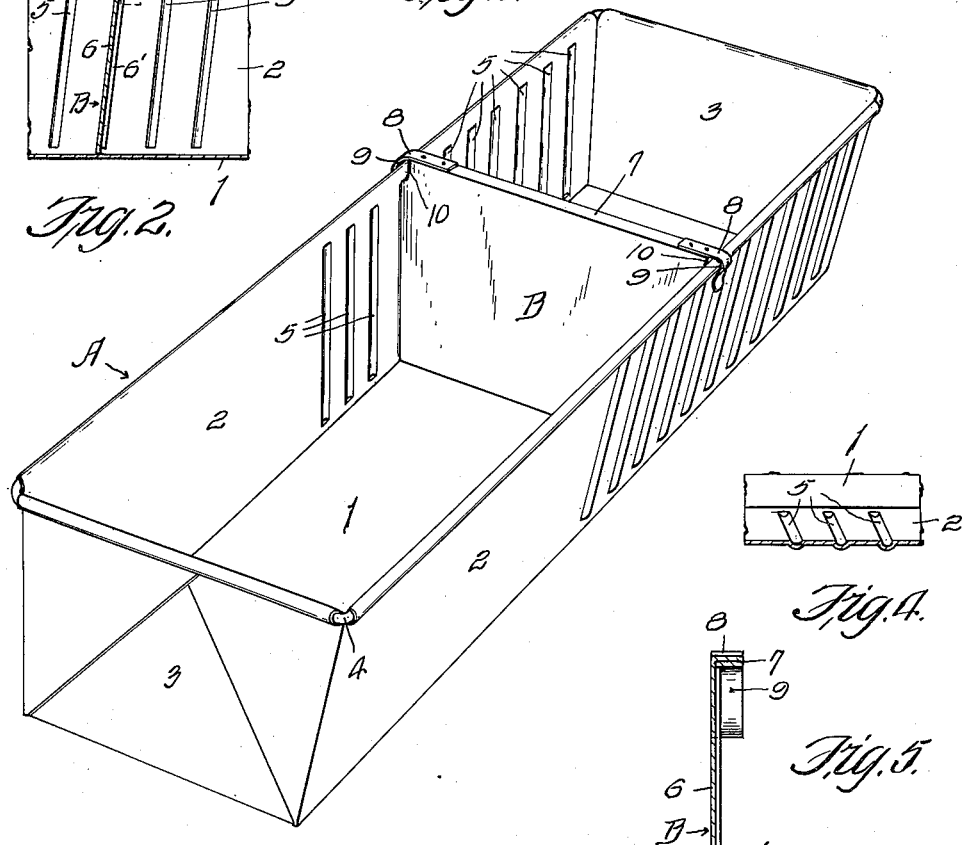
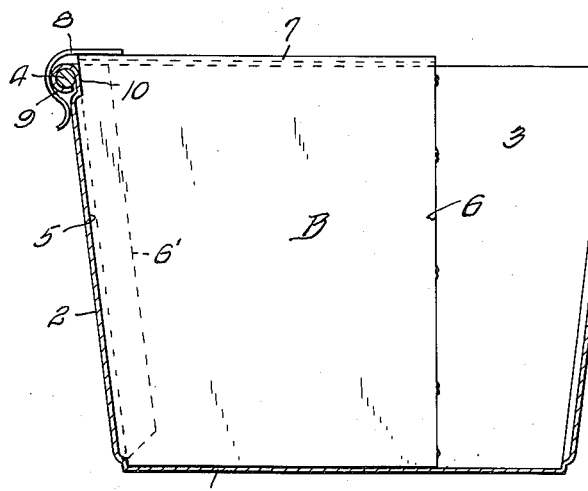
INVENTOR:
Ernst H. Petzold, Jr.
BY
ATTORNEY.

Patented Nov. 12, 1935

2,020,373

UNITED STATES PATENT OFFICE 2,020,373

BAKING PAN

Ernst H. Petzold, Jr., St. Louis, Mo.

Application February 5, 1934, Serial No. 709,762

5 Claims. (Cl. 53—6)

My invention relates to baking pans, and, it is particularly directed to pans for baking bread and other bakery products.

Another object of the invention is directed to a baking pan in which the bottom and four walls are formed integral, or permanently connected, and, to an auxiliary end wall therefor, which wall is both removable from the pan and adjustable to selected positions between the two fixed end walls of the pan to provide a baking compartment of predetermined size.

It is a well known fact that bread and other bakery products are of various loaf sizes, and, heretofore it has been necessary to have in stock, for use, baking pans to accommodate the various sizes loaves of bread, or other bakery products. This is particularly true in bread pans for use in large bakeries, due to the fluctuation in wheat prices so that when wheat goes up the loaf can be made smaller, in order to sell at a fixed price, and when wheat goes down in price, the loaf can be made larger without changing the price thereof.

In order to avoid the buying of various sized pans for a nickel and a ten cent loaf of bread, it is an aim of my invention to provide an auxiliary wall for a baking pan, which wall is removable from the pan and adjustable to selected positions between the end walls of the pan, to render useful a large pan for the baking of a loaf of bread, or other bakery product, of a smaller size, in one dimension, than the pan is designed for, thus permitting one pan to be of use in the baking of bread and the like in loaves of various sizes and weight.

A still further object of the invention is the provision of a baking pan which possesses advantages in points of simplicity and efficiency, and, at the same time proves itself comparatively inexpensive in cost of manufacture.

With the above and other objects in view, the invention will be best understood from the description of the accompanying drawing, which illustrates the embodiment of the invention.

Referring to the drawing:

Fig. 1 is a view in perspective of a baking pan embodying the features of my invention.

Fig. 2 is a fragmentary view of the pan in sectional elevation with the auxiliary end wall shown in one of its selected positions.

Fig. 3 is a transverse sectional view of the pan showing the auxiliary end wall in position therein.

Fig. 4 is a fragmentary view of the pan showing two of the grooves in one of the side walls thereof.

Fig. 5 is a vertical sectional view of the auxiliary end wall.

Fig. 6 shows a modification of the auxiliary end wall, and it is shown in position in a pan.

Fig. 7 is a detail showing one of the modified upper corners of the auxiliary end plate.

In carrying out the aim of my present invention, I employ a baking pan designated generally as A, and comprising the body 1, the side walls 2 and the end walls 3, which walls project upwardly from the bottom wall and have their upper edges of rolled formation and, preferably, although not necessarily, reinforced by a wire 4. All of the pan walls, preferably, although not necessarily, converge slightly toward the bottom wall of the pan so that products baked in the pan can be easily discharged therefrom, by turning the pan upside down, as is manifest.

The two side walls 2 of the pan A are each provided with a plurality of suitable facial grooves 5 which are inclined relative to the floor 1, as are the end walls, and the grooves 5 are spaced equal distances apart starting from one end of the pan, and, preferably, stopping somewhere about midway of the pan, although not necessarily so, as the grooves can, if desired, be increased in number to extend approximately the full length of the side walls of the pan.

Associated with the pan A, is an auxiliary end wall designated generally, as B, and comprising a wall member, or body 6, shaped to conform to one of the end walls of the pan.

The upper edge portion of the auxiliary end wall 6 is folded over upon itself and bent at a suitable angle to the auxiliary wall member 6 to provide a reinforcing rib 7 for the upper edge of the auxiliary end wall member 6. The side edge portions of the auxiliary end wall 6 are also folded upon themselves, as at 6', to reinforce said edges.

A pair of suitable flexibly resilient clips 8 are suitably secured to the upper corners of the auxiliary end wall rib 7. These clips 8 overhang the side edges of the auxiliary end wall 6 and are so shaped by forming recesses 9 therein to register with recesses 10 in the side edges of the auxiliary end wall 6 to receive the upper rolled edges of the pan A.

When the auxiliary end wall 6 is inserted into place within the pan A, the upper rolled edges of the side walls of the pan are sprung slightly apart just before reaching home position within the pan to cause the rolled edges to spring back into the recesses on the side edges of the auxiliary end wall when the auxiliary end wall reaches home position.

The grooves 5 tend to serve as means to resist movement of the auxiliary end wall 6 relative to the bottom wall 1 and the side walls 2, when forced into position in any two opposed selected grooves, and the free end of the resilient clips 8 also tend to bear against the outer faces of the side walls of the pan offering still more resistance, and especially against upward movement of the auxiliary end wall 6 in its selected position between the two end walls 2 of the pan A. However, the spring clips 8 may not be used at all, if desired, which will cheapen the cost of manufacture of the article, and yet not destroy the usefulness of the device.

When the spring clips 8 are not used, each end of the rib 7 can be extended and curved downwardly to form a lip, as at 8' to engage part of the rolled edge of the side walls of the pan to prevent spreading of the side walls of the pan after the auxiliary end wall has been positioned in a selected position within the pan. If desired, to further simplify the device, the lips 8' may be eliminated as parts of the auxiliary end wall, but in such instance there will be no means afforded to prevent spreading of the upper edges of the side walls of the pan.

It will be apparent, from the description and the drawing, that the pan can be used for baking purposes with, or without the use of the auxiliary end wall 6, and, that when the auxiliary end wall is not used, the entire pan can be used for baking purposes, and, when it is desired to bake a product smaller than the size of the pan proper, the auxiliary end wall can be used and positioned within the pan at selected positions between the end walls of the pan. Thus, it will be seen that any size of bakery product can be baked in a single pan by adjusting the size thereof through the positioning of the auxiliary end wall at desired positions within the pan between opposed walls thereof.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. In combination, an elongated baking pan having inclined side and end walls provided with outwardly rolled wire reinforced upper edges, a removable auxiliary end wall to be used at various positions between one end of the pan and the middle thereof only, opposed inclined channels formed on the inner faces of the side walls below the wire reinforcement for receiving the side edges of the auxiliary end wall, the side edges of the auxiliary end wall being folded over to reinforce the same and the upper ends of the side edges of the auxiliary end wall being recessed to receive the rolled wire reinforced upper edges of the side walls of the pan.

2. In combination, an elongated baking pan having inclined side and end walls provided with rolled wire reinforced upper edges, a removable auxiliary end wall to be used at various positions between one end of the pan and the middle thereof only, opposed inclined channels formed on the inner side faces of the side walls below the wire reinforcement for receiving the side edges of the auxiliary end wall, the side edges of the auxiliary end wall being folded over to reinforce the same, the upper ends of the reinforced side edges of the auxiliary end wall being recessed to receive the rolled wire reinforced upper edges of the side walls of the pan, and the upper edge of the removable auxiliary end wall being folded over upon itself and bent at a right angle to the remainder of the wall.

3. In combination, an elongated baking pan having inclined side and end walls provided with rolled wire reinforced upper edges, a removable auxiliary end wall to be used at various positions between one end of the pan and the middle thereof only, opposed inclined channels formed on the side walls of the pan below the wire reinforcement for receiving the side edges of the auxiliary end wall, the side edges of the auxiliary end wall being folded over to reinforce the same, the upper ends of the auxiliary end wall being recessed to receive the rolled wire reinforced upper edges of the side walls of the pan, the upper edge of the removable auxiliary wall being folded over upon itself and bent at a right angle to the remainder of the wall and resilient clips on the ends of the folded upper edge of the auxiliary end wall for clamping engagement with the rolled wire reinforced edges of the side walls of the pan.

4. A baking pan having, in combination, a flat bottom, upwardly and outwardly inclined side and end walls, a rod reinforcing the upper free edges of the side and end walls, a plurality of elongated channels extending from the lower edges of the side walls and to a point just below the reinforcing rod and positioned between one end of the pan and the middle thereof, said channels inclining upwardly toward one end of the pan and the channels being disposed in opposed pairs, a single partition having reinforced upwardly and outwardly inclined side edges adapted for reception in any pair of opposed channels, and the upper end portions of the side edges of the partition being recessed to accommodate the shape of the side walls of the pan adjacent the reinforcing rod.

5. A baking pan having, in combination, a flat bottom, upwardly and outwardly inclined side and end walls, a rod reinforcing the upper free edges of the side and end walls, a plurality of elongated channels extending from the lower edges of the side walls and to a point just below the reinforcing rod and positioned between one end of the pan and the middle thereof, said channels inclining upwardly toward one end of the pan and the channels being disposed in opposed pairs, a single partition having reinforced upwardly and outwardly inclined side edges adapted for reception in any pair of opposed channels, the upper end portions of the side edges of the partition being recessed to accommodate the shape of the side walls of the pan adjacent the reinforcing rod, and flexibly resilient members projecting outwardly and downwardly from the top edge of the partition to clamp around the reinforced upper edges of the side walls.

ERNST H. PETZOLD, Jr.